Figure 3:
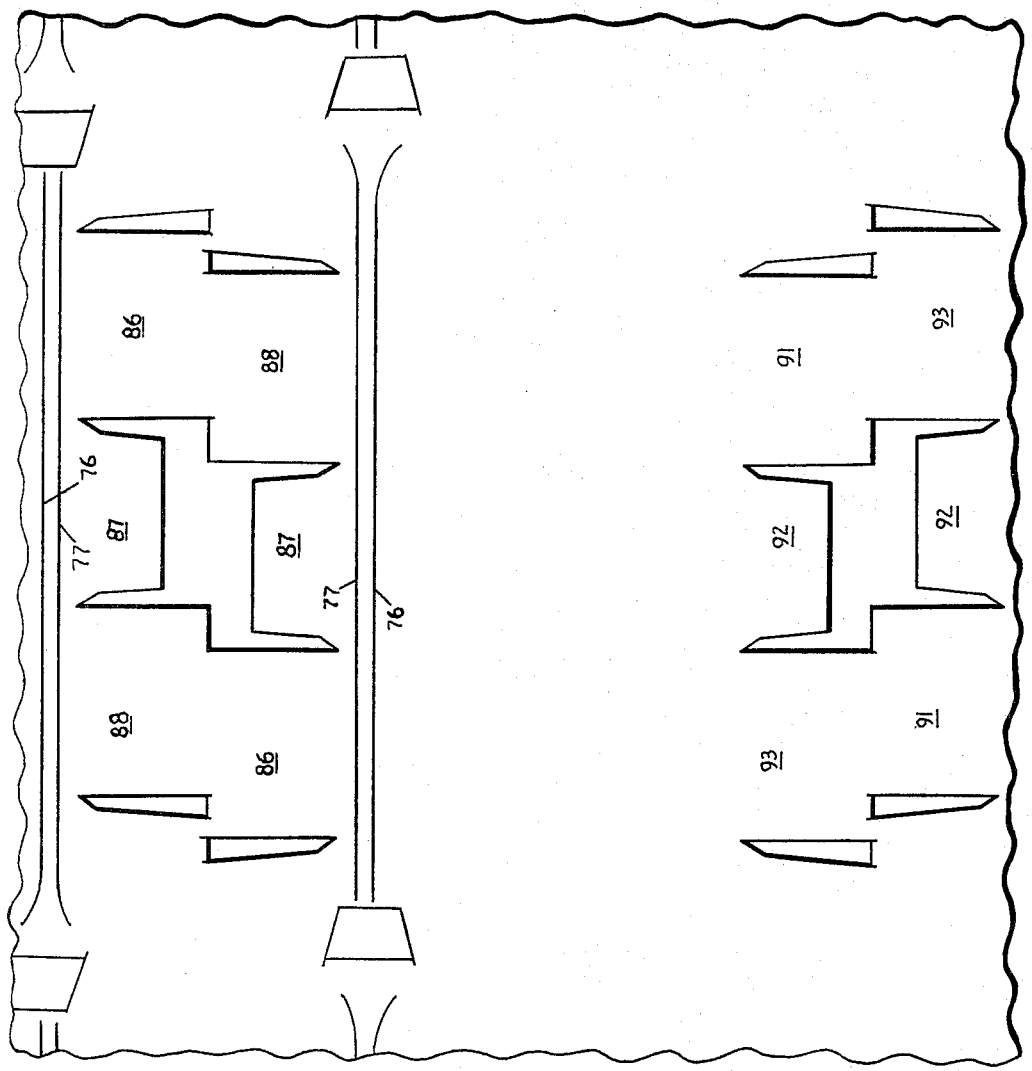

Aug. 23, 1966 M. W. KUCHENBECKER ET AL 3,268,150
LIQUID-TIGHT CARTON
Original Filed July 26, 1963 6 Sheets-Sheet 1
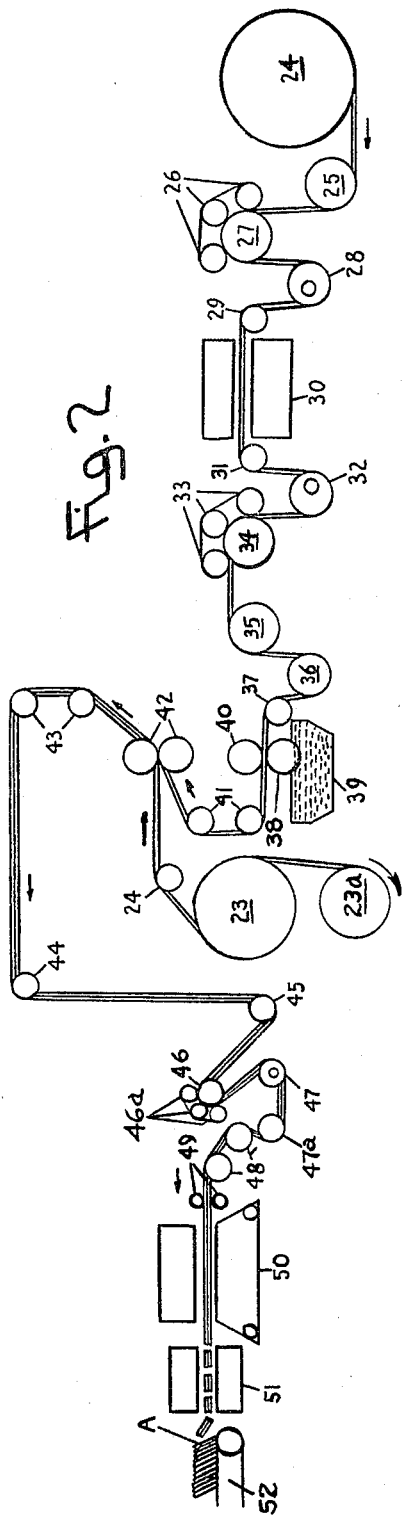
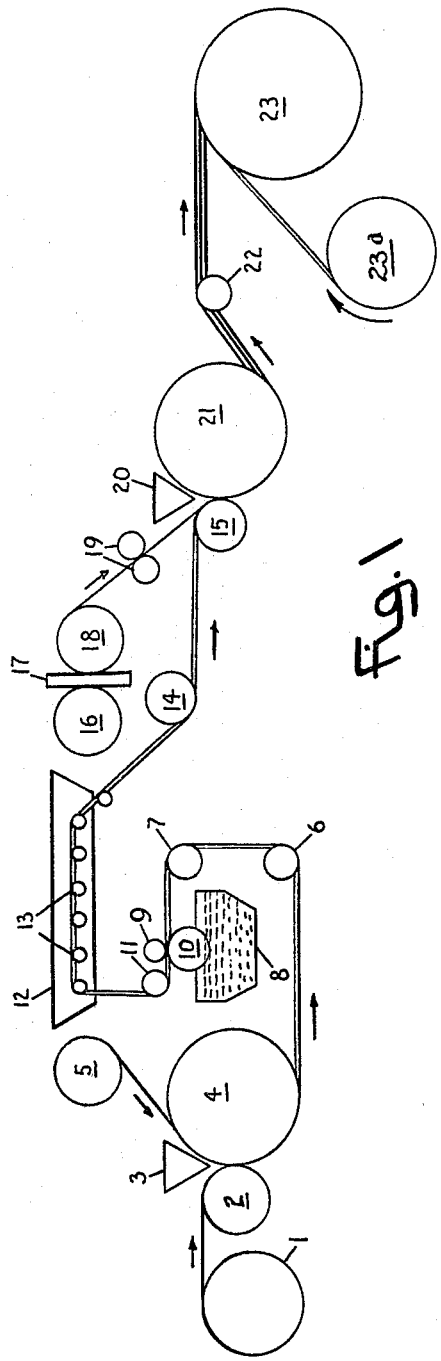
INVENTORS.
JOHN F. HELMS
MORRIS W. KUCHENBECKER
BY
George E. Verhage
ATTORNEY Aug. 23, 1966   M. W. KUCHENBECKER ET AL   3,268,150
LIQUID-TIGHT CARTON Original Filed July 26, 1963   6 Sheets-Sheet 2

INVENTORS.
JOHN F. HELMS
MORRIS W. KUCHENBECKER
BY George E. Verkage

ATTORNEY

Aug. 23, 1966 M. W. KUCHENBECKER ET AL 3,268,150
LIQUID-TIGHT CARTON
Original Filed July 26, 1963 6 Sheets-Sheet 4

INVENTOR.
JOHN F. HELMS
MORRIS W. KUCHENBECKER
BY
George E. Verhage
ATTORNEY

INVENTOR.
JOHN F. HELMS
MORRIS W. KUCHENBECKER
BY
George E. Verhage

ATTORNEY

United States Patent Office 3,268,150
Patented August 23, 1966

3,268,150
LIQUID-TIGHT CARTON
Morris W. Kuchenbecker and John F. Helms, Neenah, Wis., assignors to American Can Company, New York, N.Y., a corporation of New Jersey
Original application July 26, 1963, Ser. No. 297,861. Divided and this application June 14, 1965, Ser. No. 473,270
5 Claims. (Cl. 229—51)

This is a divison of application Serial No. 297,861 filed July 26, 1963, and now abandoned.

This invention relates generally to improved lined cartons for the packaging of liquids. More specifically, the invention relates to a method of making composite carton blanks, the blanks resulting therefrom and the cartons formed from the blanks to be used for the packaging of fruit juice concentrates.

Various containers for the packaging of liquids have been proposed before, but such containers have possessed one or more of the following undesirable properties: wicking of the edges of the packaging materials in contact with the liquid; leakage at the corners due to improper sealing of the ends of the package; insufficient strength in the packaging materials to prevent distortion and rupture of the seals; inability to be formed, filled and sealed on high speed automatic equipment; and difficulty in gaining access to the contents.

It is therefore an object of the present invention to provide producing composite carton blanks which can be readily set up, filled and sealed on automatic machinery to form improved, liquid-tight packages.

According to the present invention a composite packaging material is formed by laminating together die-cut paperboard, foil, and tissue employing adhesives and heat sealable coatings, such as polyethylene, to produce a composite web. The web is then passed through a cutting means and separated into individual blanks, which can be readily set up, filled and sealed to form a liquid-tight sealed package. Access to the contents of the package is easily gained by a tear strip opening means. Furthermore, coupled with the stated object are the ancillary objects of a construction which provides adequate protection to the contents of the container, prevents wicking of the packaging materials and permits ready opening of the closed container for access to the contents.

Figure 4:
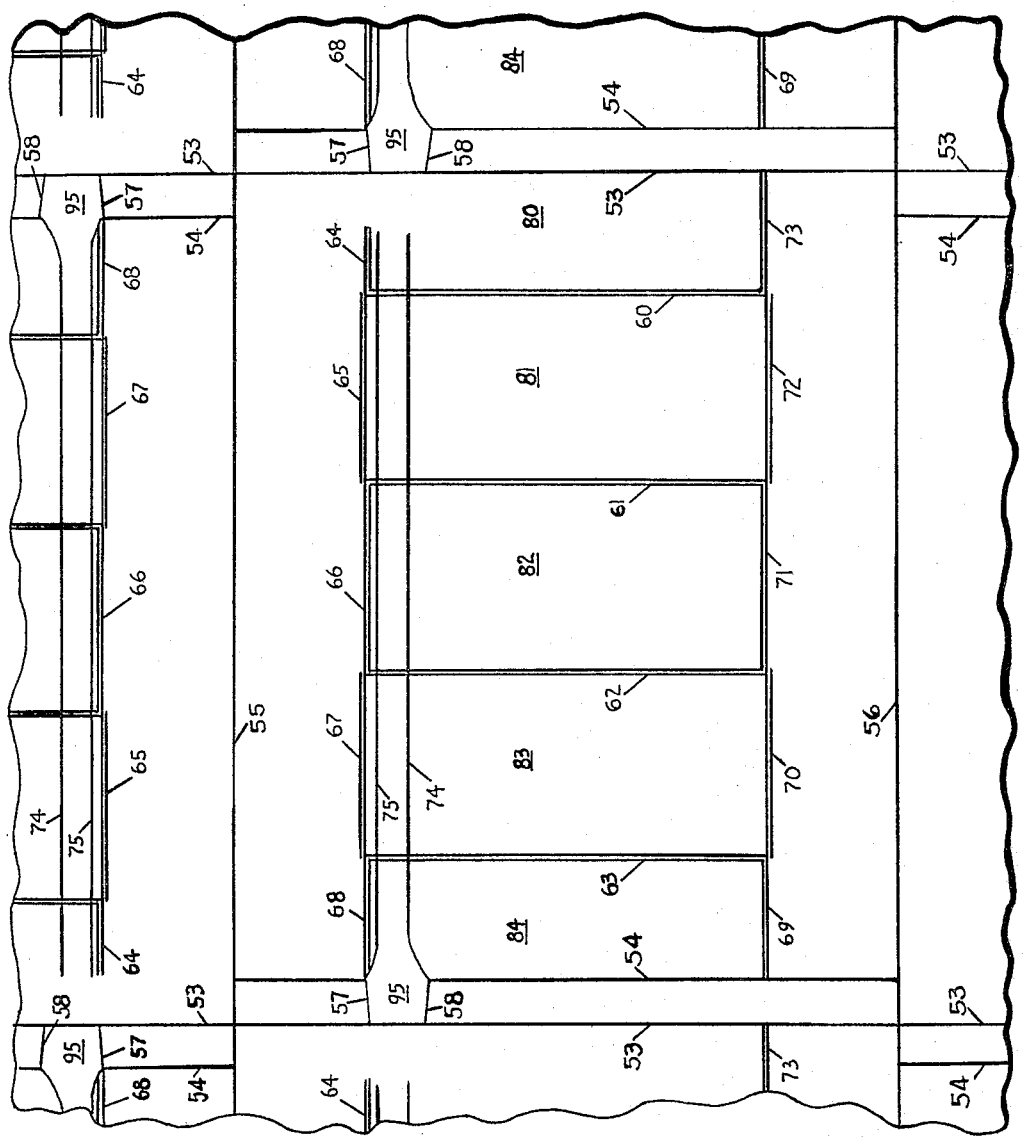
Figure 5:
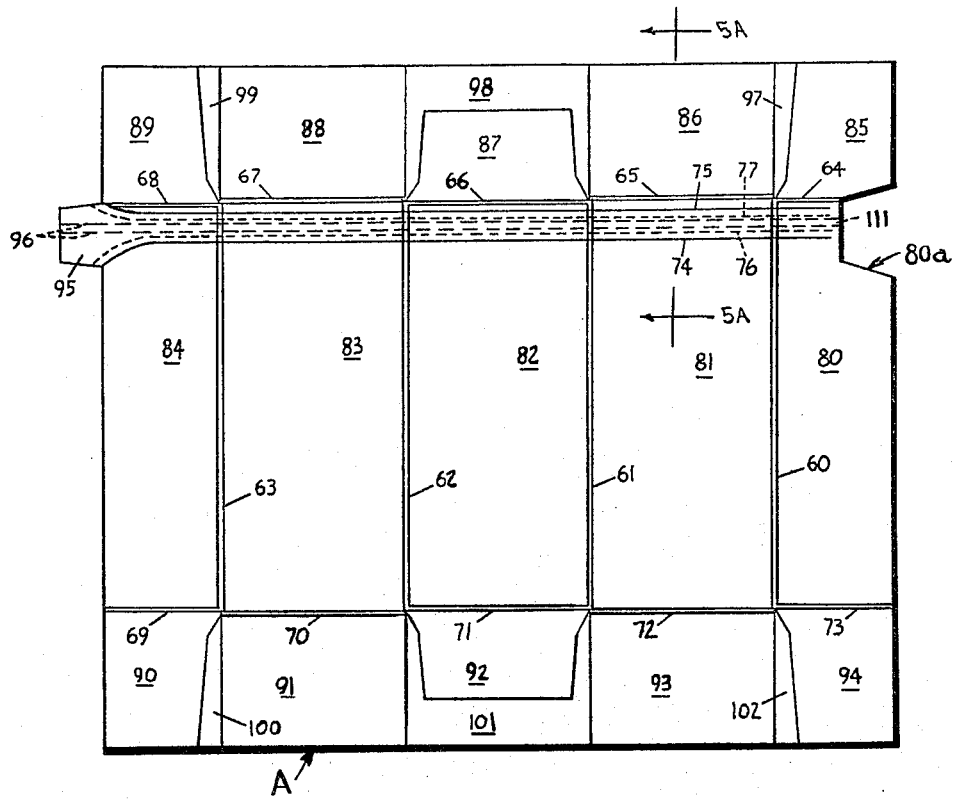
Figure 6:
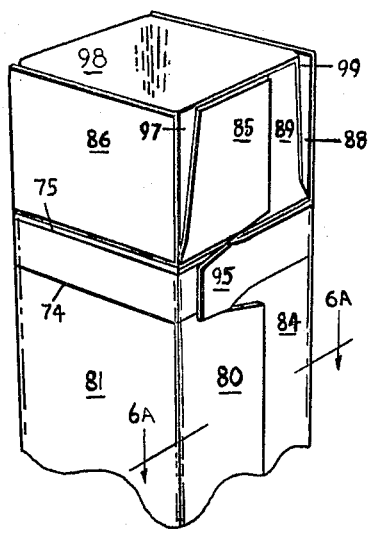
Figure 5A:
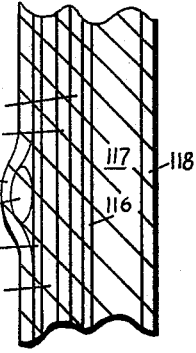
Figure 7:
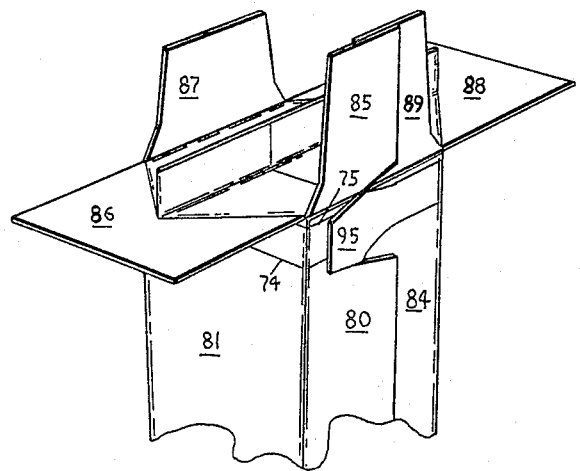
Figure 6A:
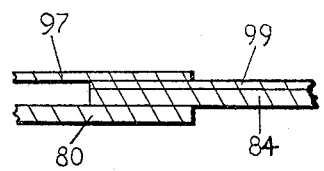
Figure 8:
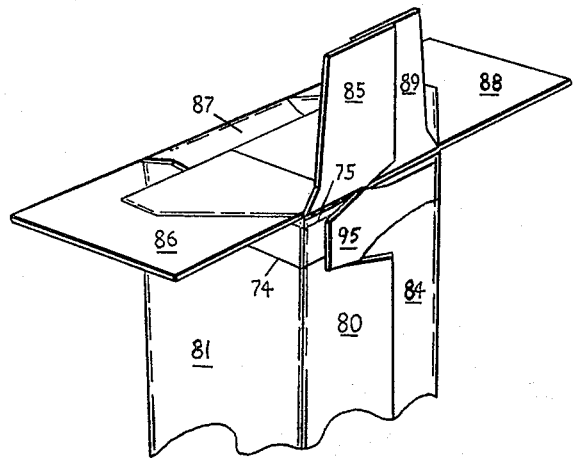
Figure 9:
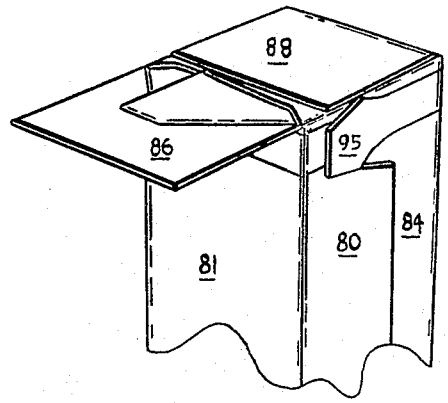
Figure 10:
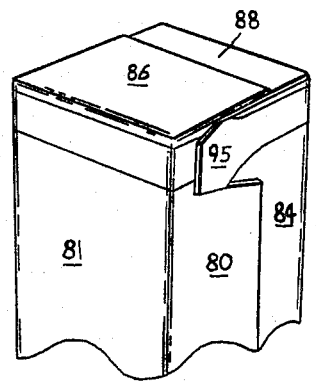
Figure 11:
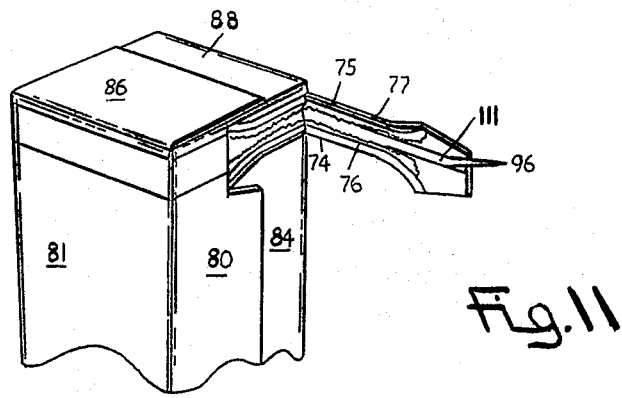

Further details, advantages and objects will be apparent from the following specification and appended drawings wherein:

FIGURE 1 is a diagrammatic representation of a method of continuously converting suitable materials into a composite web for use as container linings, FIGURE 2 is a diagrammatic representation of a method for forming a composite web to be cut into container blanks, FIGURE 3 is a plan view of a portion of a paperboard web after passing through a first cutting station prior to lamination to the composite web made as shown in FIGURE 2, FIGURE 4 is a plan view of a portion of the composite web of FIGURE 2 after passing through a second cutting station, FIGURE 5 is a plan view of an integral carton blank resulting from separation of the composite web of FIGURE 2 after passing through the second cutting station, FIGURE 5A is an enlarged fragmental sectional view of the carton blank taken along line 5A—5A of FIGURE 5 showing the composite layers of the blank, FIGURE 6 is a partial perspective view of the blank of FIGURE 5 partially set up and glued to form a carton shell, FIGURE 6A is an enlarged fragmental sectional view of the carton shell taken along line 6A—6A of FIGURE 6, FIGURE 7 is a partial perspective view similar to FIGURE 6, showing the folding and sealing of the lining material, FIGURE 8 is a partial perspective view showing a further stage in forming the completed carton, FIGURE 9 is a partial perspective view showing yet a further stage in forming the completed carton, FIGURE 10 is a partial perspective view of the completed carton, and FIGURE 11 is a partially perspective view of the completed carton having the tear strip opening means partially removed.

Referring first to FIGURE 1, there is shown a continuous method for converting frangible materials into a web of liner material having a tear tape attached thereto. Initially, a roll 1 of paper tissue is unwound from an unwind stand and the leading edge threaded through the variouns rolls in the manner shown in FIGURE 1. The tissue passes over pressure roll 2 into a nip formed by a pressure roll 2 and a cooling drum 4. A second roll 5 of metal foil is unwound, passes over the cooling drum 4 and into the nip. The two webs are laminated together by polyethylene from an extruder 3 postioned directed above and immediately adajacent the nip. After passing through the nip, the liner web is cooled by the drum 4 to reduce the temperature to about 70° F. Next, the liner web passes over idler roll 6 and 7 and between back up roll 9 and gravure roll 10. An anchor coating solution 8 is transferred by gravure roll 10 onto the paper side of the liner web. The web then passes over idler roll 11 and into a drying chamber 12 where it is supported by a series of rollers 13. The length of the chamber 12 is determined by the rate of travel of the web, the drying time of the anchoring solution and the temperature in the chamber.

After completion of the drying, the web travels under idler roll 14 and over a second pressure roll 15, which together with a second cooling drum 21 forms a second nip. A plurality of tape-unwinds or dispensers 17 are mounted in side by side relationship to unwind rolls of tape 16 and 18, which are fed between guide rolls 19 into the nip. The tapes are spaced transversely across the web and ensure even winding of the liner web. A second extruder 20 is positioned over the nip formed by pressure roll 15 and cooling drum 21 and extrudes polyethylene onto the tear tape 111 and liner web. The polyethylene firmly positions the tear tape on the composite web as well as providing a protective coating for the foil surface. After leaving the cooling drum 21, the web travels over idler roll 22. A roll of interleaving material, such as paperboard, 23a is unwound and rewound with the liner web to form roll 23. The interleaving material is approximately equal in thickness to the tear tapes and spaced between them to insure proper rolling of the web. The roll 23 is then transferred to a second line shown in FIGURE 2 where it is laminated to a web of frangible material, such as paperboard, to form a composite web which is cut into carton blanks.

The second line includes laminating, cutting and separating means. A roll of paperboard 24 is unwound and fed under idler roll 25 and over back-up roll 27. Tension control rolls 26 maintain the paperboard web in tight frictional contact with the back-up roll 27. The paperboard web then travels around eccentric feed up roll 28, over idler roll 29 into a first cutting section 30, over ilder-roller 31, around eccentric take-off roll 32 and between tension control rolls 33 and back-up roll 34. Eccentric feed-up and take-off rolls 28 and 32, respectively, provide alternating periods of slack and tension in the web permitting use of a reciprocating cutting means 30.

A comparison of the portion of the paperboard web of FIGURE 3 and a separated blank of FIGURE 5 shows the relationship between the initial cuts in the web and the completed blank. The cuts shown in FIGURE 3 are impressed on what is ultimately the interior side of the blank. Cuts 76 and 77 extend only partially through the board while the remainder of the cuts are through the entire thickness of the web. In addition to defining cut out portion 80a (see FIGURE 5) the cut lines define the side edges of flaps 86–88 and 91–93.

After passing through cutting means 30 and the rolls associated therewith, the web travels over idler rolls 35–37 and between gravure roll 38 and back-up roll 40. An adhesive 39 is applied to what is ultimately the inner side of the carton blank by gravure roll 38. The adhesive coated web next travels around idler rolls 41 and into a nip formed by a pair of pressure rolls 42. Roll 23, which is adjacent pressure rolls 42, is unwound and fed into the same nip and laminated to the paperboard web with the tear tape and foil on the outside. As the roll 23 is unwound the interleaving material is transferred to a winding roll 23a.

The laminated web then travels over a series of idler rolls 43–45 and between back-up roll 46 and tension control roll 46a where it is maintained in tight frictional contact with the rolls. The composite web then travels over eccentric feed-up roll 47 to provide alternating periods of slack and tension for reciprocating cutting means 50. Idler rolls 47a, 48 and guide rolls 49 feed the web into the cutting means 50 where a cutting and creasing operation is performed on the web prior to separation of the blanks in the separating unit 51 and transfer to the stacking table 52.

Referring to FIGURES 4 and 5, the relationship between the second web cutting operation and the finished blank is shown. Cut lines 74 and 75 extend only partially through the thickness of the paperboard from the outside surface. Other cut lines 53–58 extend entirely through the composite web and define the individual blank. Score lines 60–73 are impressed on the web to provide fold lines for the various panels and flaps.

FIGURE 5 shows the outside of a completed composite blank. The blank is divided by score lines 60–73 into panels and flaps including main panels 80–84 and end flaps 85–94. A tear strip having a pull tab 95 is defined on the inside of the paperboard layer by partial cut lines 76–77 and on the outside by partial cut lines 74–75. The liner composed of tissue, foil and polyethylene and having the tear tape (see broken lines 111) thereon is coextensive with the outer generally rectangular configuration of the paperboard layer. Portions 97–102 of the lines are visible in FIGURE 5. FIGURE 5A is a fragmental sectional view of the composite blank taken through the area of the tear tape. The various layers and typical material used in the carton blank shown in cross-section in FIGURE 5A are as follows:

layer 110—polyethylene—ten pounds per ream
layer 111—cotton or rayon tear tape coated with a heat-sealable material and about .007 inch thick
layer 112—polyethylenimine anchor coating
layer 113—aluminum foil—.00035 inch thick
layer 114—polyethylene—ten pounds per ream
layer 115—paper tissue—sixteen pounds per ream
layer 116—vinyl acetate adhesive—five pounds per ream
layer 117—paperboard—.0012 inch thick
layer 118—polyethylene—ten pounds per ream The blank is formed into a shell about a rectangular mandrel with the foil on the inside. Main panels 81, 82 and 83 are folded about their connecting score lines to positions of contact with three sides of the mandrel. Next, main panel 80 is folded about score line 61 to lie inclined at an angle of about thirty degrees to the remaining mandrel wall. The liner, which is not adhered along the longitudinal free edge of main panel 80, is separated from the main panel 80 folded against the remaining wall of the mandrel. The main panel 84 is folded inwardly about score line 62 and the edge thereof inserted between the unadhered portion of the liner and the edge of main panel 80. The pull tab 95 is kept on the outside surface of main panel 80 to facilitate opening of the completed carton. The cut out 80a is necessary to obtain both the split seam and the cross over of the pull tab 95 on the outside of the carton. Sealing heat and pressure are then applied to all of the overlapped areas, except the tear tab 95 to produced the squared shell shown in FIGURE 6. FIGURE 6A shows the split seam with main panel 84 between the liner and main panels 80.

After forming the squared carton shell, usually one end is closed and sealed, the carton filled, and the other end closed and sealed. Since the closing and sealing steps for both ends of the carton are the same, reference is had to closing and sealing just one end of the carton.

The carton is closed and sealed by first forming a fin seal, as shown in FIGURE 7, with the projecting liner which is not adhered to the end flaps. The liner after folding is sealed by the application of heat and pressure to obtain adhesion between the polyethylene bearing surfaces. Next end flap 87 is folded inwardly about its connecting score line 66 to lie superposed on the carton liner. The sealed portion of the liner is then folded down to overlie end flap 87 as shown in FIGURE 8. End flaps 85, 89 are folded down on the liner and then end flap 88 is folded inwardly to overlie overlapped end flaps 87, and 85, 89, as shown in FIGURE 9. The closure is completed by infolding end flap 86 into overlapping relationship with end flap 88 and applying sealing heat and pressure to adhere the two flaps in the overlapped area. The completed sealed carton is shown in FIGURE 10.

The carton is opened by grasping pull tab 95 and pulling outwardly away from main panel 81 towards main panel 83. Exposure of the contents is obtained by consecutively pulling the tear strip through main panels 84, 83, 82, 81 and 80 thus freeing the portion of the carton above the tear strip. The contents can then be readily dispensed from the remaining receptacle portion of the carton.

The particular opening action of the tear strip is illustrated in FIGURE 11. The inner layer of polyethylene 110 (shown in FIGURE 5A) overlying the tear tape 111, due to its adhesion to the tear strip, is removed with the tear tape. Tear tape 111, being of greater strength than the foil-tissue combination, causes rupture of the combination along the edges of the tape. Cut lines 76 and 77 in the inner surface and 74 and 75 in the outer surface of the paperboard facilitates removal of the tear strip. The paperboard peels from the inner end of cut lines 76 and 77 in the interior of the paperboard, to the interior ends of cut lines 74 and 75. Therefore in the area between the cut lines in the removed tear strip the thickness of the paperboard is substantially one-half of the original thickness. The relationship between the thickness of the layers shown in FIGURE 5A is varied with regard to the protection desired and the ease of removal of the tear strip.

The present invention provides a liquid-tight container, which has a tear strip opening means giving easy access to the contents of the container. Since the liner completely encloses the product and prevents exposure of the paperboard to the product, wicking of the exterior of the carton is prevented. Extruding polyethylene over the tear tape firmly adheres it in place as well as protecting it from deterioration due to product contact. Although exemplified with polyethylene, it is obvious that other extrudable film materials could be employed. The overlapping of the pull tab on the outside of the carton provides easy access to it for opening purposes.

It is understood that the size and shape of the blank and hence the carton, and that the specific materials from which they are formed can be varied in numerous ways by those skilled in the art without departing from the spirit of the invention.

We claim:

1. A leakproof carton made from a paperboard blank comprising three hingedly connected full main panels consecutively positioned at right angles to each other and a pair of overlapping partial main panels, hingedly connected to the opposed pair of said three full main panels, together forming a fourth full main panel; end flaps hingedly connected to the edges of said main panels and forming end closures for the carton; one of said partial main panels having a cut-out portion extending inwardly from the free edge thereof and the other of said partial main panels having a pull tab extending outwardly therefrom, said pull tab being threaded in said cut-out portion, substantially parallel lines of weakness extending from said pull tab through said main panels to said cut-out portion; a liner on the interior of said paperboard having a first edge portion adjacent said one partial main panel overlying and adhered to the other edge portion, which along with the other partial main panel is interposed between said first edge portion and said one partial main panel; a tear tape positioned on said liner between said lines of weakness by a film material cover, said liner material and said tear tape.

2. A carton blank comprising a sheet of paperboard suitably shaped for formation into a liquid-tight carton, a layer of thermoplastic material adhered to the outer surface of the paperboard blank, a tear tape adjacent the inner face of said paperboard blank and extending substantially one full dimension of said blank, and a layer of thermoplastic material for adhering the tear tape to the inner surface of the paperboard blank, said last named thermoplastic layer being substantially co-extensive with the dimensions of the paperboard blank whereby the carton may be sealed in the vicinity of the tear tape by adhering the thermoplastic material on the outer surface of the paperboard to the thermoplastic material on the inner surface of the paperboard.

3. A carton blank of suitable shape for erection into a liquid-proof container comprising a paperboard layer, a thin film of thermoplastic material adhered to the outer surface of the said paperboard layer, a sheet of foil adhered to the inner surface of said paperboard, a tear tape adhered to the exposed face of said foil sheet, said tape extending substantially one full dimension of the blank, and a layer of thermoplastic material for adhering the tape to the foil sheet, said thermoplastic layer being co-extensive with the dimensions of the blank whereby a side seam may be formed by opposite edges of the blank when erected.

4. The carton set forth in claim 3 further including a line of weakness in said paperboard layer on each side of the tear tape.

5. A leakproof carton made from a paperboard blank comprising three hingedly connected full main panels consecutively positioned at right angles to each other and a pair of overlapping partial main panels, hingedly connected to the opposed pair of said three full main panels, together forming a fourth full main panel, end flaps hingedly connected to the edges of said main panels and forming end closures for the carton, a pull tab extending outwardly from one of said partial main panels, substantially parallel lines of weakness extending from said pull tab through said main panels into said other partial main panel, a liner on the interior of said paperboard having a first edge portion adjacent said one partial main panel overlying and adhered to the other edge portion, which along with the other partial main panel is interposed between said first edge portion and said one partial main panel, a tear tape positioned on said liner between said lines of weakness by a film material cover, said liner material and said tear tape.

References Cited by the Examiner
UNITED STATES PATENTS 2,909,312  10/1959  Conerty _____ 229—51
2,970,736  2/1961  Baughan _____ 229—51

JOSEPH R. LECLAIR, *Primary Examiner.*

DAVID M. BOCKENEK, *Examiner.*